United States Patent [19]

Hwo et al.

[11] Patent Number: 5,206,292

[45] Date of Patent: Apr. 27, 1993

[54] PELLETIZING AID FOR MANUFACTURING POLYOLEFINS

[75] Inventors: Charles C. Hwo, Sugar Land; William J. Graff, Houston, both of Tex.

[73] Assignee: Shell Oil Company, Houston, Tex.

[21] Appl. No.: 889,870

[22] Filed: May 28, 1992

[51] Int. Cl.⁵ .............................................. C08L 23/04
[52] U.S. Cl. ..................................... 525/240; 525/193; 524/528; 528/499; 528/502
[58] Field of Search ................ 525/240, 193; 524/528; 528/499, 502

[56]  References Cited

U.S. PATENT DOCUMENTS 4,440,899  4/1984  Peerlkamp ........................... 525/240
4,960,820  10/1990 Hwo ..................................... 524/528

OTHER PUBLICATIONS

Typical Properties/Particle Characteristics For A-C® Polyethylenes, A-C® Copolymers, And Acumist® Micronized Polyethylene Powders, AC® Polyethylenes, Allied Signal.

Primary Examiner—Paul R. Michl
Assistant Examiner—LaVonda Dewitt
Attorney, Agent, or Firm—James O. Okorafor

[57]  ABSTRACT

A method for substantially minimizing the agglomeration of freshly manufactured polyolefin pellets, comprising adding an effective amount of oxidized high density polyethylene powder during the manufacturing process. The method results in the production of more commercially desirable non-agglomerated polyolefin pellets.

16 Claims, No Drawings

PELLETIZING AID FOR MANUFACTURING POLYOLEFINS

FIELD OF THE INVENTION

This invention generally relates to polyolefins. In particular, this invention relates to the pelletization of high melt flow or low molecular weight polyolefins.

BACKGROUND OF THE INVENTION

Polyolefin polymers, including methods for their production, are well known in the art. These polymers can be pelletized during manufacture, and sold as pellets to processors. During pelletization, difficulties arise. These difficulties have been particularly observed with high melt polyolefins, and are evidenced by the tendency of the polymer product to agglomerate. Although, this agglomeration occurs during the production of polyolefinic homopolymers and/or copolymers, it appears to be more severe with the copolymers. This is because the copolymers generally have a slower crystallization rate, and less crystallinity than the homopolymers. It has been suggested that this is due in part, to the sticky nature of the high melt flow product.

The adverse consequences of this agglomeration include an unwillingness on customers part to buy such agglomerated pellets, and interferences with production, arising from a sporadic need to shut down production in order to clean up processing equipment.

Various attempts have been made to solve or to minimize this problem of undesired pellets agglomeration. For example, surfactant(s) and defoamer combinations, notably zinc stearate and FOAMTROL®, has been used with some success. The drawbacks of this combination include the resulting high content of zinc stearate in waste water, and the potential carcinogenic nature of FOAMTROL®. High density polyethylene (HDPE) powders such as MICROTHENE®, has also been used with some success. The primary disadvantage of MICROTHENE® usage is that it floats on the surface of the water-bath or tank. The floating causes an overflow of the Microthene® HDPE from the water-bath or tank which in turn results in processing disruptions requiring the occasional cleaning up of equipment and work environment, and constant stirring to ensure that the MICROTHENE® is properly dispersed.

Because the presently known materials and/or methods, have not satisfactorily resolved the problem of pellet agglomeration, the need for new and better materials and/or methods continues to exist.

SUMMARY OF THE INVENTION

This invention provides a method for minimizing the agglomeration of freshly manufactured polyolefin pellets comprising adding an effective amount of oxidized high density polyethylene powder to a device comprising a cooling agent and freshly prepared pellets during manufacturing of the pellets.

The oxidized high density polyethylene powder, sometimes hereinafter referred to as a pelletizing aid, disperses effectively, thus reducing the need for constant and intensive mixing, causes minimal foaming, and substantially reduces agglomeration of pellets.

DETAILED DESCRIPTION OF THE INVENTION

Generally speaking the materials useful in the practice of this invention include a high density polyethylene powder, polyolefin, and a polymer pelletizing equipment. Still generally speaking, the practice of this invention involves adding a suitable quantity of an oxidized high density polyethylene powder to a cooling device comprising a cooling agent and freshly prepared polyolefin pellet during the pelletizing stage.

Polyolefin polymers suitable in the practice of this invention include polyethylene, polyesters, polyisoprene, polypropylene, polybutene-1 (polybutylene), and their copolymers. Preferred among these polyolefins are polypropylene and polybutene-1, with polybutene-1 being particularly preferred.

The useful polypropylene polymer can be either a homopolymer or copolymer of polypropylene. Such polypropylene polymers including their methods of manufacturing, and their properties are known in the art. One source for obtaining additional information relating to the polypropylene polymer is U.S. Pat. No. 4,960,820.

The preferred polybutene-1 can be isotactic, elastomeric, syndiotactic, or it can have any characteristic that is known or expected of polybutene-1 polymers. Particularly preferred is isotactic polybutene-1 polymer. The polybutene-1 polymers, including their methods of preparation, and their properties are very well known in the art. The interested reader is directed to exemplary references such as U.S. Pat. No. 4,960,820.

Oxidized high density polyethylene powder suitable in the practice of this invention is commercially available. An example of such a commercial product is ACUMIST® which can be obtained from Allied Signal Company. Table 1 provides additional information on the various types of ACUMIST® products. MICROTHENE® has been included for comparative purposes.

TABLE 1

| | | Pellet Aid Data/Specifications | | | |
|---|---|---|---|---|---|
| PRODUCT TRADE NAME | PRODUCT NUMBER | PRODUCT TYPE | PHYSICAL FORM | PARTICLE SIZE ($\mu$) | DENSITY (g/cc) |
| Microthene[1] | FA-750 | Polyolefin powder | micronized | 20 | 0.95 |
| Acumist | A-C A-18 | Oxidized PE wax | micronized | 15 | 0.99 |
| Acumist | A-C 316A | Oxidized HDPE | ground | 141 | 0.98 |
| Acumist | A-C 392A | Oxidized HDPE | granule | 379 | 0.99 |
| Acumist | A-C 395A | Oxidized HDPE | ground | 133 | 1.00 |

[1]Microthene® is manufactured by Quantum Chemical.

The oxidized high density polyethylene powder is sometimes also referred to as a dusting agent. Those that are useful in the practice of this invention generally have certain density and particle size characteristics and are preferably present within a certain quantity.

In order to properly disperse, the oxidized high density polyethylene powder should have a density at 25° C. of about 0.97 to 1.05 g/cc. A density of 1.0 or very close to 1.0 is preferred.

The particle size of the oxidized high density polyethylene powder must not be either too large or too small so that the powder is not effective. A particle size within the range of 10-500 microns is preferred.

The oxidized high density polyethylene powder is generally present in the cooling device comprising the pellets and cooling agent in an amount of from about 0.01-2 wt %, with 0.1-0.5 wt % being preferred. It is noted that an excessive amount of the oxidized high density polyethylene powder adversely affects the performance properties of the polyolefins.

Freshly prepared pellets as used herein is defined as the material such as polymers transformed from its fluid or molten state to a finish solid shape which is designed for easy processing in the subsequent part fabrication. The equipment used for the transformation is generally an extruder and die, through which a certain shape of polymer melts are molded and solidified. In commercial practice, the solidification of the polymer melts are expedited via a cooling device to remove the heat effectively.

Furthermore, each such molded small shapes or entities such as pellets of polymer melts are minimized from joining or sticking with each other by utilizing a different material such as a dusting agent or anti-agglomeration agent.

Cooling agent as used herein is defined as a medium which functions as a material to remove the heat of the other materials so that this other material can be transformed from molten state to the solid state at a faster or more effective rate. Generally speaking, the cooling agent can be any fluid or substance that can absorb or conduct heat. For example, the cooling agent can be air or water in a continuous circulation used to absorb heat through convection. Other cooling agents can be a material such as metals which act as a conduction medium to transfer the heat from other materials.

Process

The polymeric material to be shaped in the molten state is first fed through a plasticization device such as an extruder through which the polymer melts are pumped through a die with multiple holes.

The polymer melts are then molded by the die into a rod shape and cut into pellets by a continuously rotating knife. Water containing a pelletizing aid is circulated through a loop containing a cutting station, a circulation line, and a water-bath. The water-bath is initially filled with water containing a certain concentration of pelletizing aid. The pellets with water are then discharged into a screen shaker and thereafter fed to a spinning dryer or vice versa and subsequently charged to a storage container ready for sales. The water is replenished to its required level in the water-bath and the pelletizing aid is occasionally added to the water-bath so as to maintain its required concentration.

The following non-limiting examples and tables further illustrate the various aspects of the invention.

EXAMPLE(S)

A total of five products were tested (Table 1) using the same pellets and pelletizing aid to water ratio (0.3% pellet aid to H2O and 12% pellets to H2O) that would be present in the crystallization tank under normal operating conditions.

Each pelletizing aid material was placed in a translucent mixing tub which contained three gallons of water. Pellets were added, and the blends were agitated for thirty minutes using an air activated stirrer.

The blends were observed for dispersion, pellet agglomerations, foaming, floating and settle time. Each product was rated as being very good, good or poor in each of the categories. Table 2 gives a description of the performance criteria for each of the characteristics.

TABLE 2

Performance Criteria For Pellet Aid Products

| VERY GOOD | GOOD | POOR |
|---|---|---|
| DISPERSION - How well did product disperse in water? | | |
| water has cloudy white appearance - all material is dispersed in water. | most material is dispersed in water - water has hazy appearance. | very little dispersion - water is almost clear. |
| FLOATING - How much product settled to surface during mixing? | | |
| <10% | 10-50% | >50% |
| FOAMING - Amount of foam present after 30 minutes mixing? | | |
| none present | small amount | large amount |
| SETTLE TIME - Amount of product that settled five minutes after mixing was ceased. | | |
| <50% | 50-75% | >75% |
| PELLET AGGLOMERATIONS - Did product prevent pellets from forming into globs and sticking together? | | |
| no formations | small formations | large formations |

TABLE 3

Performance of Pellet Aid Products

| PROPERTY/PRODUCT | PERFORMANCE | | |
|---|---|---|---|
| | VERY GOOD | GOOD | POOR |
| DISPERSION | | | |
| FA-750 (Control) | | | X |
| A-18 | X | | |
| 316A | X | | |
| 392A | X | | |
| 395A | X | | |
| FLOATING | | | |
| FA-750 (Control) | | | X |
| A-18 | X | | |
| 316A | X | | |
| 392A | | X | |
| 395A | X | | |
| FOAMING | | | |
| FA-750 (Control) | X | | |
| A-18 | | X | |
| 316A | | X | |
| 392A | | X | |
| 395A | | X | |
| SETTLE TIME | | | |
| FA-750 (Control) | | | X |
| A-18 | | X | |
| 316A | X | | |
| 392A | | X | |
| 395A | X | | |
| PELLET AGGLOMERATION | | | |
| FA-750 (Control) | | | X |
| A-18 | X | | |
| 316A | X | | |
| 392A | X | | |
| 395A | X | | |

From the performance ratings tabulated in Table 3, it is evident that the ACUMIST° products perform better than MICROTHENE ®. ACUMIST ® 316A and 395A exhibited the best overall performance of excellent dispersion, prevention of pellet agglomeration, long settling times, and resistance to floating. ACUMIST ® A-18 and 392A also performed very well in most of the observed (tested) areas.

While this invention has been described in detail for the purpose of illustration, it is not to be construed as limited thereby but is intended to cover all changes and modifications within the spirit and scope thereof.

What is claimed is:

1. A method for minimizing the agglomeration of freshly manufactured polyolefin pellets comprising adding an effective amount of oxidized high density polyethylene powder to a device comprising a cooling agent and said freshly prepared pellets during the manufacturing of said pellets.

2. A method as in claim 1 wherein said cooling agent is a member of the group consisting of fluids or substances that can absorb or conduct heat.

3. A method as in claim 1 wherein said cooling agent is air or water.

4. A method as in claim 1 wherein said polyolefin pellets are polybutylene-1 pellets.

5. A method as in claim 1 wherein said polyolefin pellets are polypropylene pellets.

6. A method as in claim 1 wherein said oxidized high density polyethylene powder has a density at 25° C. of from about 0.97–1.05 g/cc.

7. A method as in claim 1 wherein said oxidized high density polyethylene powder has a particle size of from about 10–500 microns.

8. A method as in claim 1 wherein said oxidized high density polyethylene powder is present in an amount of from about 0.01–2 wt %.

9. A method as in claim 4 wherein said oxidized high density polyethylene powder has a density at 25° C. of about 1.0 g/cc.

10. A method as in claim 4 wherein said oxidized high density polyethylene powder has a particle size of from about 10–500 microns.

11. A method as in claim 4 wherein said oxidized high density polyethylene powder is present in an amount of from about 0.1–0.5 wt %.

12. A method as in claim 5 wherein said oxidized high density polyethylene powder has a density at 25° C. of about 1.0 g/cc at 25° C.

13. A method as in claim 5 wherein said oxidized high density polyethylene powder has a particle size of from about 10–500 microns.

14. A method as in claim 5 wherein said oxidized high density polyethylene powder is present in an amount of from about 0.1–0.5 wt %.

15. A product made by the process of claim 1.

16. A product made by the process of claim 2.

* * * * *